Aug. 23, 1960 H. HOFFMAN, JR 2,950,467

MULTIPLE SECTION MEMORY

Filed Jan. 3, 1958 2 Sheets-Sheet 1

Inventor
Harry Hoffman
by Edgar H. Kent, Atty.

Inventor
Harry Hoffman
by Edgar H. Kent
Att'y.

United States Patent Office 2,950,467

Patented Aug. 23, 1960

2,950,467

MULTIPLE SECTION MEMORY

Harry Hoffman, Jr., Saugerties, N.Y., assignor to International Business Machines Corporation, New York, N.Y., a corporation of New York Filed Jan. 3, 1958, Ser. No. 707,014

8 Claims. (Cl. 340—174)

This invention relates to magnetic storage devices such as are utilized in data processing equipment, and more particularly it relates to magnetic core storage circuitry incorporating coincident selection principles.

In data storage devices for high-speed digital computers, for example, often a multiplicity of memory elements are arranged in a plurality of planes. The elements typically consist of magnetic cores and the state of magnetization of each may be sensed by utilizing a coincident current system of selection. In each plane, the location of a particular core is defined in terms of a row and a column. To select a particular core, currents having a magnitude of one-half the selection value are passed through the selection winding associated with the column and the selection winding of the row. At the intersection of the column and row, i.e. at the selected core, the total current is sufficient to saturate that core but none of the other cores are subjected to sufficient current to produce this result.

However, the current which does pass through these other cores produces changes in the flux in the magnetic material. Although the individual outputs which result are small, under certain circumstances these outputs may add algebraically thereby impairing discrimination and sensing.

In order to minimize this effect, a bipolar sense winding is frequently utilized. The bipolar sense winding is constructed in two series connected sections a first of which is threaded through half the cores in one direction with respect to the other windings on the cores, and the second of which is threaded through the remaining half of the cores in the opposite direction. The sense winding terminals are connected to the input terminals of a sense amplifier where the bipolar nature of the sense winding tends to cancel the outputs from the half-selected cores. However, when all the half-selected cores threaded by one of the sense winding sections contain a "one" and all those threaded by the other sense winding section contain a "zero" often an insufficient amount of cancellation is produced.

A further problem is that the magnitude of the output signal produced by a half selected core is dependent on the initial state of magnetization of the core. As a result the degree of cancellation obtained may be insufficient when certain patterns of core magnetization are present. This phenomena is discussed in greater detail hereinafter.

Two principal methods have been utilized heretofore to overcome this difficulty. As the "half selected" output tends to peak sooner than the "one" output, some systems have endeavored to make use of a delay in the sensing operation. In order to provide sufficient discrimination between the "half selected" output and the "one" output, however, the sensing operation must be delayed a substantial time which causes a reduction in "one"-"zero" discrimination since the amplitude of the "one" pulse at the time of sensing is necessarily reduced.

In addition, this technique introduces an undesirable increase in the length of access time.

A second method, more commonly utilized, is to provide a special signal, denominated a post-read disturb or a post-write disturb, such that all the cores are maintained in the same disturbed condition. In this manner undesirable patterns of ones and zeros are prevented from occurring. However, this system necessarily requires a substantial increase in the length of the memory cycle. In data processing equipment, generally a premium is placed on the efficient use of machine time and this is particularly true of high speed digital computers wherein the length of the memory cycle determines in large part the speed of the machine.

Accordingly, a principal object of the present invention is to provide means to increase the availability of the data storage element by reducing the length of the memory cycle.

A further and related object is to provide improved means for preventing the buildup of a deleterious, noise producing pattern of data storage element magentization.

A more particular object is to provide a means to reduce the half select noise which eliminates the need for post-read disturb or post-write disturb signals.

According to the present invention, a data storage means, utilizing a coincident current method of selection, is divided into a plurality of regions. Successive addresses, as determined by the internal stored program of the associated apparatus, are assigned to different regions of the memory. A separately controlled digit plane driver or similar device is associated with each region of the memory, and the drivers are adapted to generate a disturb signal in those regions of the memory which are not being utilized by the associated data processing equipment during that particular memory cycle. This signal conditions the magnetic memory elements in each such region of the memory in a similar manner such that the biuldup of an undesirable pattern of magnetization is prevented.

Other objects and advantages will become apparent from the following description of a preferred embodiment of the invention taken in conjunction with the drawings, in which.

Figure 2:
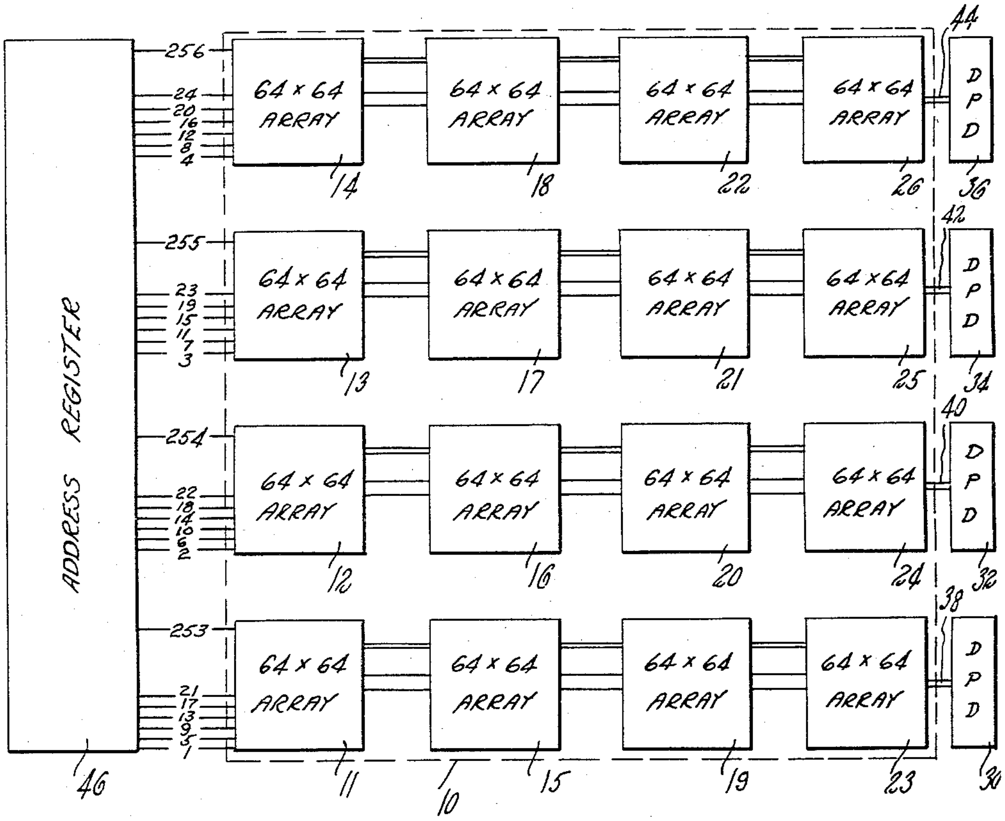
Fig. 2 is a diagrammatic illustration of a digit plane of the memory of the preferred embodiment.
Figure 1:
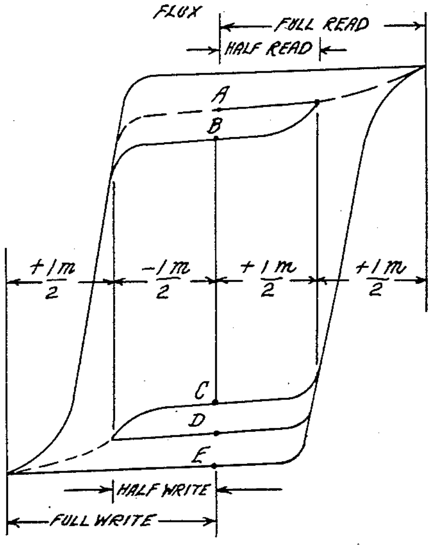
Fig. 1 is a representation of typical hysteresis curves for the magnetic cores used in the memory of the preferred embodiment.

In a coincidence current system of core selection, a core may be in one of five-basic states of magnetization. Typical magnetization curves for a ferrite core are shown in Fig. 2, the positive direction being arbitrarily selected as read, and the negative direction as write (a one). Half select or disturb currents provide intermediate stages of magnetization as indicated. A core in read disturbed zero condition, as is produced by a write zero, half read sequence, for example, is magnetized as indicated by point A. A write disturbed zero core, which corresponds to a written zero, is at point B. A read disturbed one core, as is produced by a write one, half read sequence, for example, is at point C. A write disturbed one core as is produced by a write one, half read, half write sequence, for example, is at point D, and an undisturbed or newly written one core is at point E. A sixth state of magnetization, undisturbed zero, is not shown because a read operation may be and usually is always followed by a write operation, and in writing a zero it is conventional to pass a half amplitude current through an inhibit winding on the core, which current is opposite in sense to the write current, resulting in the write disturbed zero (B) condition.

The half-select noise problem arises during the reading operation whereby the state of a particular core in memory is ascertained. During this operation certain cores are subjected to read currents of one-half the select magnitude. When such a half-selected core has been initially in the write disturbed one (D) condition, a greater voltage is induced into the sense winding than when the core has been initially in the read disturbed one (C) condition. A core in the read disturbed one (C) condition induces a greater voltage than does a core in the read disturbed zero (A) condition. In general, the differential permeability determines the output of a core traversing minor loops such as are produced by half amplitude currents. The differential permeability is least in the vicinity of saturation of the material and, therefore, the output produced by a disturb pulse which drives the core towards the nearest saturated state is less than the output produced when a core is disturbed away from saturation. This is why the cores in a disturbed one condition (C or D) produce a greater voltage output than cores in a disturbed zero condition (A or B). Due to the difference between the half-selected one output and the half-selected zero output, a difference voltage, herein denominated "delta," is produced. The overall arrangement of ones and zeros determines the magnitude of the "delta" voltage and whether it is added or subtracted from the desired output. The largest "delta" voltage is produced by the pairing of read disturbed zeros (A) with write disturbed ones (D) which corresponds to the worst possible signal to noise ratio.

The output of the sense winding is generally amplified by a differential amplifier and then converted to a positive voltage which is used as the gating voltage on a gate tube. The gate tube is sensed by a relatively short pulse such as a one-tenth microsecond pulse, thereby producing a one-tenth microsecond pulse output when the core contains a one. By way of example, "one" output from a core may be approximately one microsecond in duration. A "zero" output from a core may be approximately twenty milli-volts in amplitude, and four-tenths of a microsecond in duration at the base. In addition to having a shorter duration, a "zero" tends to peak sooner than a "one," and hence a "one" is best recognized if the gate tube associated with the sense amplifier is sensed when the gating volage produced by a "one" is approximately at a maximum.

Broadly, the present invention contemplates disturbing regions in the memory array that the computer is not utilizing during each memory cycle. The region containing the selected address may or may not be disturbed depending on whether a one or a zero is being written. Conventional digit plane drivers which function to provide the inhibit pulses used in writing "zeros" are preferably used to generate the disturb currents as well. A detailed description of such a driver appears in the copending application Serial Number 570,199 of Harold D. Ross et al., filed March 7, 1956, and entitled, "Electronic Data Processing Machine." When all regions are non-selected, as during the time when the computer is utilizing another memory, they are all disturbed. To make it probable that all the cores will be disturbed at frequent intervals, successive addresses are located in different regions.

With reference to Fig. 2 there is shown diagrammatically a core memory 10, such as that described in detail in the aforementioned copending application, which is divided into sixteen sections (11–26), each section containing a sixty-four by sixty-four array of cores. A digit plane driver (30, 32, 34, 36) is associated with each region of four sections and is connected to an inhibit winding (38, 40, 42, 44 respectively) thereof. The regions are connected to an Address Register 46 in a sequentially addressed manner such that Section 11 includes addresses 1, 5, 9 and 13, etc.; Section 12 includes addresses 2, 6, 10, 14, etc.; Section 13 includes address 3, 7, 11, 15, etc.; and Section 14 includes addresses 4, 8, 12, 16, etc. Similar addressing may, of course, be used in the other dimension of the memory. In this way successive addresses within the memory fall in different regions which are connected to individual digit plane drivers.

Figure 3:
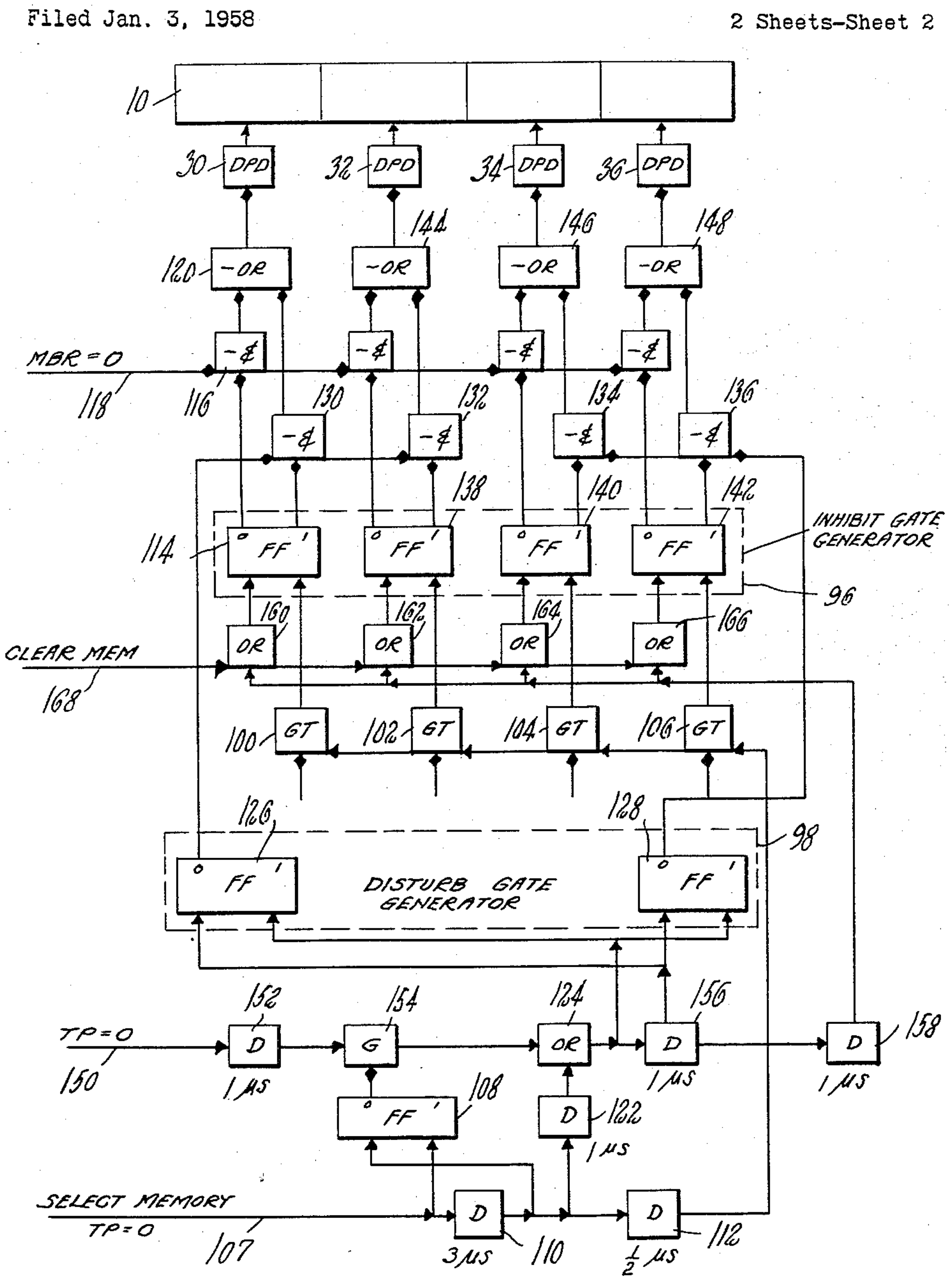
Fig. 3 is a logical diagram in block form of circuitry utilized for controlling the digit plane drivers according to the invention.

The circuitry for controlling the Digit Plane Drivers is shown in Fig. 3. The two lowest order bits of the Address Register are used to select the Digit Plane Drivers. By means of a conventional decoder matrix a signal is produced which conditions one of gate tubes 100, 102, 104, 106 associated with the selected group. A gated pulse at TP=O (at the beginning of a memory cycle) sets flip-flop 108 (removing the conditioning level from gate 154) and is passed through the three-microsecond delay unit 110 (provided to prevent interference with the read out of the selected core) and one-half microsecond delay unit 112 to sample gate tubes 100, 102, 104 and 106. Assume gate tube 100 is the one conditioned as described above. Its resultant output sets flip-flop 114 in an Inhibit Gate Generator 96. As flip-flop 114 is set, the zero side of that flip-flop produces a minus 30 volt output which conditions one input of Negative AND circuit 116. The other input to this AND circuit by way of line 118 will be negative if the digit to be written is a zero and AND circuit 116 will then have an output which produces conduction in Negative OR circuit 120. Conventionally the digit will be held in a Memory Buffer Register (not shown). The output of Negative OR circuit 120 conditions the Digit Plane Driver (DPD) 30 so that it produces an inhibit current. This is the Digit Plane Driver associated with the region of Memory selected by the Computer. Digit Plane Drivers 32, 34, 36 are therefore associated with the unselected regions. An output is provided from these Digit Plane Drivers in the following manner.

The Select Memory pulse at TP=O which was passed through delay unit 110 passes through one microsecond delay unit 122 and OR circuit 124 to set flip-flops 126, 128 in a Disturb Gate Generator 98. These flip-flops are set and as the outputs from the zero sides are negative, they condition one input to Negative AND circuits 130, 132, 134 and 136. Flip-flop 114 in the Inhibit Generator 96 was set by the selection pulse but flip-flops 138, 140 and 142 remain cleared and the one side of these flip-flops have negative outputs which condition the second inputs to Negative AND circuits 132, 134 and 136. The resultant outputs from these AND circuits are passed through OR circuits 144, 146 and 148 repectively, to condition the Drivers 32, 34, and 36 and thereby produce the disturb currents in the non-selected groups of the Memory. A complete description of Inhibit Gate Generator 96 and Disturb Gate Generator 98 may be found in the aforementioned copending application.

In the case where this Memory is not selected, a raw (ungated) timing pulse is passed through conductor 150 at TP=O and one microsecond delay unit 152 to sample gate 154. This gate is conditioned only when flip-flop 108 is cleared, delay unit 152 being provided to insure that flip-flop 108 (deconditioning gate 154) is set by the Select Memory pulse through line 107 if this memory is selected. Flip-flop 108 thereby provides an interlock between Memories. If gate tube 154 is conditioned, the pulse is passed through OR circuit 124 to set flip-flops 126 and 128 in the Disturb Gate Generator 38. The resultant negative outputs from the zero sides of the flip-flops condition Negative AND circuits 130, 132, 134, and 136. As no flip-flops in the Inhibit Gate Generator 96 is set, all these AND circuits have outputs which condition their associated Digit Plane Drivers, thereby producing disturb currents on all regions of this memory.

The control pulse from OR circuit 124 is also passed through one microsecond delay circuit 156 and its output clears the Disturb Gate Generator 98 (flip-flops 126 and 128) removing the conditioning level from AND circuits 130, 132, 134, and 136.

The output of delay unit 156 is passed through one microsecond delay unit 158 and through the OR circuits 160, 162, 164 and 166 to clear the flip-flops in the Inhibit Gate Generator 96, thus resetting the circuitry for another memory cycle. The Inhibit Gate Generator is also cleared by a Clear Memory pulse on line 168.

The result of this circuitry is that the Digit Plane Drivers associated with at least three regions will be operated during each memory cycle, to provide a disturb current equivalent to a half-read current to all cores which they control. In this manner, most of the cores are placed in a read disturbed state and only a limited number of cores will be in the write disturbed one state.

While this system is particularly adaptable to a large memory, and associated Address Register such as described in detail in the aforementioned copending application, and also copending application Serial Number 576,976 of Hawley K. Rising et al., filed April 9, 1956, and entitled "Magnetic Memory," the principles, disclosed herein can also be applied to smaller memories wherein as few as two groups of drivers are utilized.

Also it will be understood that while what has been shown and described herein is a preferred embodiment, the intent is that the invention not be limited thereto or to all the details thereof, but that departures may be made therefrom which are within the spirit and scope of the invention as set forth in the appended claims.

I claim:

1. A coincident current memory system comprising a multiplicity of bistable magnetic elements arranged in a plurality of digit planes, corresponding elements in each plane being disposed in corresponding coordinate addressable locations, each of said memory planes being divided into a plurality of regions, coincident current operated data transfer means for transferring information to and from elements at a selected memory address location, and disturb signal applying means associated with each region adapted to apply a disturb signal to the elements in all regions other than those regions which contain the selected address location during each information transfer.

2. The memory system as claimed in claim 1 wherein said coincident current operated means includes signal generating means adapted to apply two successive pulses of opposite polarity to the elements at the selected address location, the first pulse being adapted to read out information stored in the selected elements and the second pulse being adapted to write one binary value into said selected elements, and further including a digit plane driver associated with each plane region and means for selectively operating the digit plane drivers associated with those regions which include the selected address location concurrently with the application of said second pulse for writing the other binary value in elements at said selected address location, said disturb signal applying means being adapted to operate the digit plane drivers associated with the non-selected regions.

3. The memory system as claimed in claim 2 wherein said magnetic elements are ferrite cores and each digit plane driver has a winding associated therewith which links every core in the associated region, said driver being adapted to provide a pulse of predetermined magnitude and polarity to all cores in the associated region.

4. The memory system as claimed in claim 2 further including digit plane driver control means operative in response to memory timing signals, said control means comprising a disturb gate generator adapted to control the operation of the digit plane drivers associated with non-selected regions during any information transfer for providing a disturb signal of predetermined polarity to all the elements in said non-selected regions and an inhibit gate generator adapted to control the operation of digit plane drivers associated with the selected regions for writing said other binary value into certain of said elements at said selected address in accordance with memory control signals.

5. The memory system as claimed in claim 4 wherein said control means further includes means for disabling the digit plane drivers associated with the selected regions during the generation of said first pulse by said signal generating means.

6. Apparatus as claimed in claim 1 wherein said computer is programmed such that successive addresses in said memory are in different regions.

7. In a high speed stored program digital computer, a coincident current memory system comprising a plurality of memory arrays, each array including a multiplicity of bistable magnetic elements arranged in a plurality of digit planes, corresponding elements in each plane being disposed in corresponding coordinate addressable locations, said memory planes being divided into a plurality of regions and successive memory addresses being assigned to different regions, coincident current operated data transfer means for transferring information to and from elements at a selected memory address location including signal generating means adapted to apply two successive pulses of opposite polarity to the elements at the selected address location, the first pulse being adapted to read out information stored in the selected elements and the second pulse being adapted to write one binary value into said selected elements, a digit plane driver associated with each plane region and digit plane driver control means operative in response to memory timing signals, said control means comprising a disturb gate generator adapted to control the operation of the digit plane drivers associated with non-selected regions for applying a disturb signal of predetermined polarity to all the elements in said non-selected regions during each information transfer, an inhibit gate generator adapted to control the operation of the digit plane drivers associated with the selected regions for applying an inhibit signal to certain elements at said selected address concurrently with the application of said second pulse to write the other binary value into said certain elements in accordance with memory control signals, and means for disabling the digit plane drivers associated with the memory array containing the selected address during the generation of said first pulse by said signal generating means.

8. The memory system as claimed in claim 7 wherein said magnetic elements are ferrite cores and each digit plane driver has a winding associated therewith which links every core in the associated plane region, each said driver, when operated by said control means, being adapted to provide a pulse of predetermined magnitude and polarity to all the cores in the associated region.

References Cited in the file of this patent

UNITED STATES PATENTS

| | | |
|---|---|---|
| 2,784,391 | Rajchman | Mar. 5, 1957 |
| 2,809,367 | Stuart-Williams | Oct. 8, 1957 |